(12) United States Patent
Muehlbauer et al.

(10) Patent No.: US 9,579,994 B2
(45) Date of Patent: Feb. 28, 2017

(54) ADJUSTABLE SEAT SUPPORT

(71) Applicant: Amerequip Corporation, Kiel, WI (US)

(72) Inventors: Eric J. Muehlbauer, Kiel, WI (US); Adam L. Palmer, Beloit, WI (US); James N. Varner, Appleton, WI (US)

(73) Assignee: Amerequip Corporation, Kiel, WI (US)

( * ) Notice: Subject to any disclaimer, the term of this patent is extended or adjusted under 35 U.S.C. 154(b) by 0 days.

(21) Appl. No.: 14/517,701

(22) Filed: Oct. 17, 2014

(65) Prior Publication Data

US 2015/0108811 A1   Apr. 23, 2015

Related U.S. Application Data

(60) Provisional application No. 61/892,383, filed on Oct. 17, 2013.

(51) Int. Cl.
*B60N 2/14* (2006.01)

(52) U.S. Cl.
CPC ......... *B60N 2/143* (2013.01); *Y10T 29/49826* (2015.01)

(58) Field of Classification Search
CPC ..... B60N 2/143; B60N 2/1625; B60N 2/1695
USPC ............ 297/344.12, 344.21, 344.24, 344.14
See application file for complete search history.

(56) References Cited

U.S. PATENT DOCUMENTS

| | | | | |
|---|---|---|---|---|
| 2,503,796 A | * | 4/1950 | Bruhn | B60N 2/38 248/594 |
| 2,821,239 A | * | 1/1958 | Brendel | B60N 2/40 248/584 |
| 4,047,759 A | * | 9/1977 | Koscinski | B60N 2/502 248/567 |
| 4,083,599 A | * | 4/1978 | Gaffney | A61G 5/14 248/393 |
| 4,134,617 A | | 1/1979 | Matsubara | |
| 4,227,670 A | | 10/1980 | Vander Burgh et al. | |
| 4,241,893 A | | 12/1980 | Koutsky et al. | |
| 4,278,144 A | | 7/1981 | Perin | |
| 4,436,270 A | * | 3/1984 | Muraishi | B60N 2/146 248/416 |
| 4,570,997 A | | 2/1986 | Tanizaki et al. | |
| 5,086,869 A | * | 2/1992 | Newbery | B60K 23/00 180/329 |
| 5,127,699 A | * | 7/1992 | Maezawa | E02F 9/166 180/326 |
| 5,154,402 A | * | 10/1992 | Hill | B60N 2/502 248/429 |
| 5,221,071 A | * | 6/1993 | Hill | B60N 2/502 248/582 |
| 5,584,460 A | | 12/1996 | Ropp | |
| 5,636,884 A | * | 6/1997 | Ladetto | B60N 2/06 296/65.09 |

(Continued)

*Primary Examiner* — David R Dunn
*Assistant Examiner* — Tania Abraham
(74) *Attorney, Agent, or Firm* — Andrew C. Landsman; Godfrey & Kahn, S.C.

(57) ABSTRACT

An adjustable seat support permits attaching and adjusting an operator's seat on a vehicle for both forward and rear facing operation. Also disclosed is a method for attaching and adjusting an operator's seat on a vehicle can be selectively positioned for both forward and rear facing operation.

7 Claims, 13 Drawing Sheets

(56) References Cited

U.S. PATENT DOCUMENTS

| | | | |
|---|---|---|---|
| 6,318,802 B1 * | 11/2001 | Sjostrom | B60N 2/0705 296/65.13 |
| 6,447,065 B1 * | 9/2002 | Ropp | A47C 3/18 248/349.1 |
| 6,711,839 B1 | 3/2004 | Kawamura et al. | |
| 6,957,853 B2 | 10/2005 | Williams et al. | |
| 7,669,823 B2 | 3/2010 | Brodersen | |
| 8,182,016 B2 * | 5/2012 | Kaip | B60N 2/01583 296/65.06 |

* cited by examiner

ADJUSTABLE SEAT SUPPORT

CROSS-REFERENCE TO RELATED APPLICATION

This application is based on and claims priority to U.S. Provisional Patent Application No. 61/892,383 filed on Oct. 17, 2013, which is incorporated herein by reference in its entirety for all purposes.

FIELD OF THE INVENTION

The present invention relates generally to the field of adjustable seat supports. More particularly, the present invention relates to an adjustable seat support for attaching and adjusting an operator's seat on a vehicle that can be selectively positioned for both forward and rear facing operation.

BACKGROUND

Tractors and other work vehicles often include both front and rear facing tools or attachments, which allow a single vehicle to perform multiple functions on a worksite or farm. Such attachments may be directly driven by the tractor motor using a power take-off ("PTO") shaft, or may also be hydraulically or electrically driven. Depending on the type of attachments used, it is often desirable for a user to be able to position the seat of the work vehicle so that the user can face the direction of the attachment. For example, a tractor may have a front loader attached to the front of the tractor, with a backhoe attached to the rear of the tractor. Operation of a backhoe requires the operator to be able to see the backhoe, and the controls of the backhoe are positioned accordingly.

Typical tractors approach the issue of needing a front and rear facing seat in one of two ways. First, some tractors are equipped with two separate seats, one front facing and one rear facing. Having two separate seats allows the seats to be positioned optimally for operation of the tractor and the rear facing implement, and operator comfort is maintained. Many other tractors, however, omit the rear facing seat in favor of a front facing seat that may only be adjusted rotationally to a rear facing position. Such "swivel" seats typically do not allow an operator to adjust the horizontal or vertical position of the seat and put a premium on operator comfort only when the seat is used in the front facing position. Commonly, controls for the rear attachment are positioned either higher or lower than the forward operating controls. Additionally, controls for the rear facing attachment may be closer or farther away from the seat horizontally when compared to the position of the front facing controls. Using a seat that merely swivels may place the operator in an uncomfortable operating position, which may result in increased operator fatigue and could even lead to injury if used for prolonged periods of time.

As such, there is a need for an adjustable swivel seat for a work vehicle that may be retrofitted to existing work vehicles using a minimum of parts, and may be adjusted not only rotationally, but also vertically and horizontally to allow an operator to use a single seat to achieve the comfort and ergonomics of a two seat tractor.

SUMMARY

The present invention is an adjustable seat support for a vehicle having a base plate removably attached to the vehicle. A swivel plate having a swivel channel is attached to the base plate by a plurality of adjustable links, and a seat plate is rotatably attached to the swivel plate. The plurality of links allow the swivel plate to move horizontally with respect to the base plate. Each of the adjustable links has a bottom portion adjustably attached to a top portion. The adjustable links allow the seat plate to move vertically with respect to the base plate.

The present invention further relates to a method of using the adjustable seat support for a vehicle.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
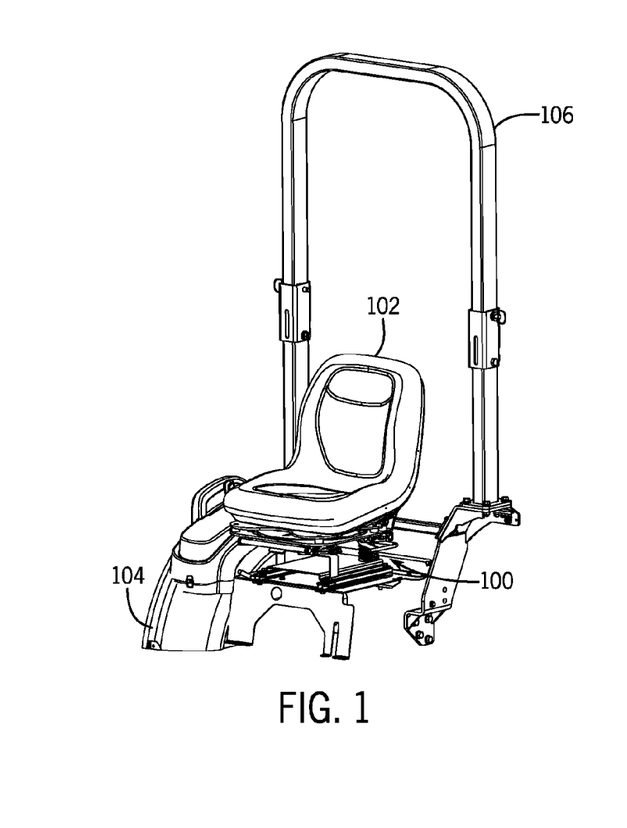
FIG. 1 is a perspective view of an adjustable seat support in accordance with the invention showing the seat support in a forward operating position.
Figure 2:
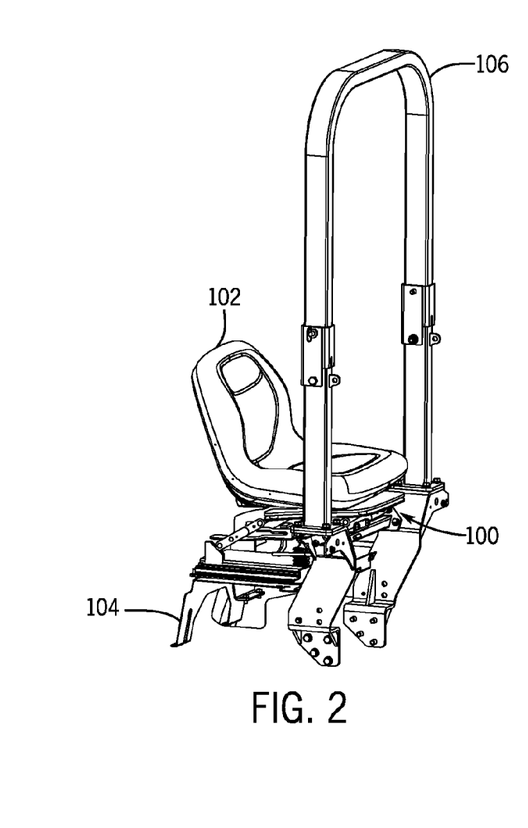
FIG. 2 is a perspective view of the adjustable seat support of FIG. 1 showing the seat support in a rearward operating position.

The present invention is an adjustable seat support for a vehicle such as a tractor and a method for using same. Turning now to FIGS. 1-2, one embodiment of an adjustable seat support 100 in accordance with the invention is shown. The adjustable seat support 100 allows an operator to adjust an operator's seat 102 on a tractor 104 so that a single seat can be used to operate a rear attachment and for tractor operation. The adjustable seat support 100 includes a plurality of mount hole options that allow the adjustable seat support to be attached to multiple tractors. An operator's seat 102 is attached to the adjustable seat support 100 and allows operation of the tractor 104 when in a forward facing position. The adjustable seat support includes three degrees of movement: (1) vertical, (2) horizontal, and (3) rotational. The three degrees of movement allow the adjustable seat support to rotate 180 degrees, and to be adjusted for height and horizontal distance from controls for a rear attachment. Additionally, the three degrees of movement allow an operator to find an ideal position for the seat while also avoiding objects on the tractor. This allows the adjustable seat support 100 to be used in multiple applications. The adjustable seat support 100 further provides a seat for operating a rear attachment that is mounted to the tractor 104 rather than the attachment. Using such a seat allows the attachment to be in a much more optimum position. Using the adjustable seat support 100 also allows the attachment to be mounted closer to the tractor rear axles which reduces stress on the tractor rear axles and increases the angle of departure for loading and unloading the tractor 104 onto or off of trailers.

FIG. 1 shows an operator's seat 102 mounted to adjustable seat support 100. The operator's seat 102 is in a forward facing position on a tractor 104. FIG. 2 shows the operator's seat 102 in a rearward facing position on the tractor 104. As will be described in further detail, the adjustable seat support 100 allows an operator to move the operator's seat 102 between the forward and rearward facing positions with minimal effort, and the movement of the seat remains within the tractor roll over protection structure ("ROPS") 106.

Figures 3, 3A:
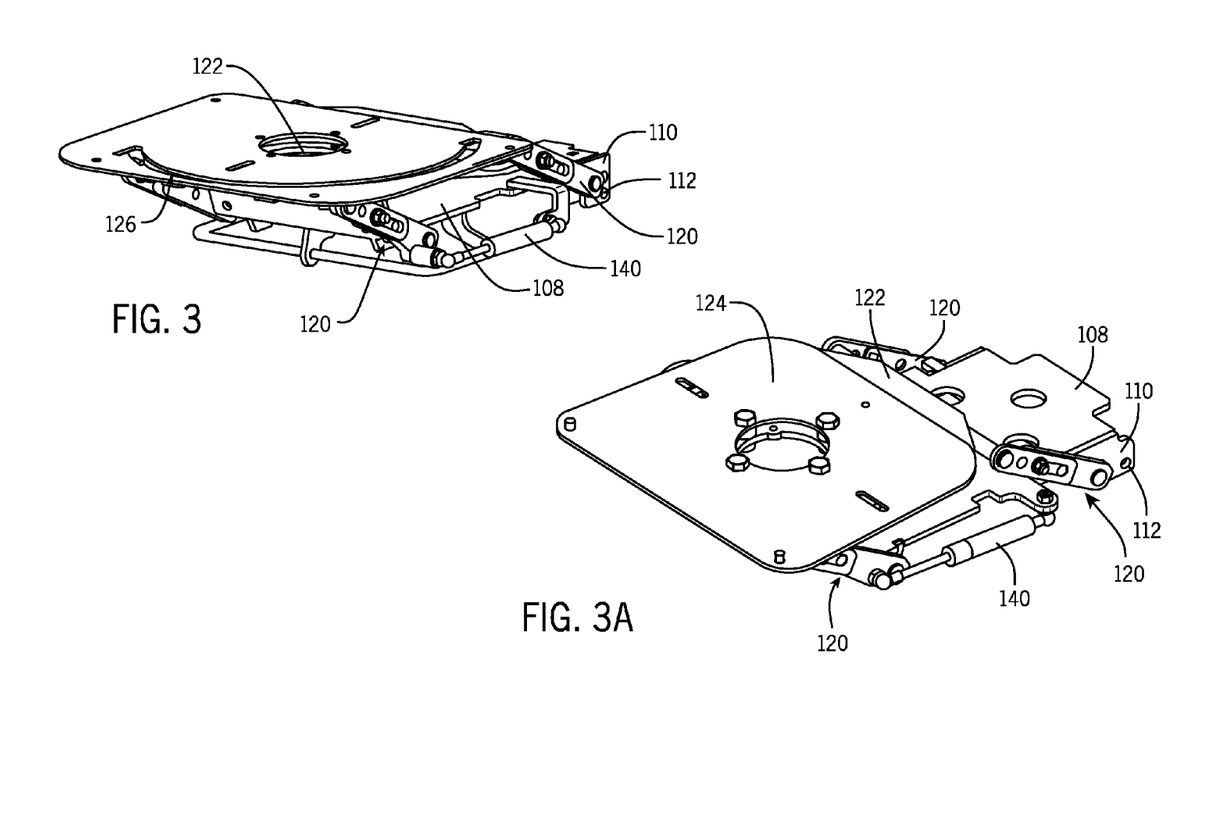
FIG. 3 is a perspective view of the adjustable seat support of FIG. 1.
FIG. 3A is another perspective view of the adjustable seat support of FIG. 1.
Figure 12:
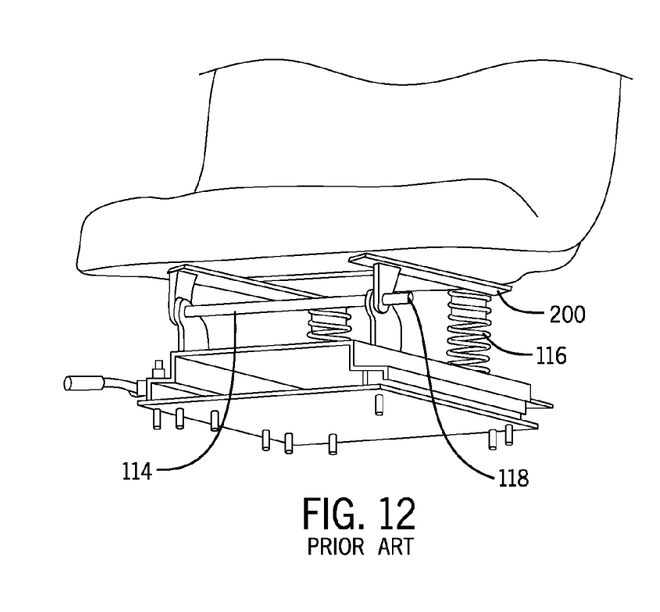
FIG. 12 is a detail perspective view of the prior art seat support of FIG. 12.
Figure 13:
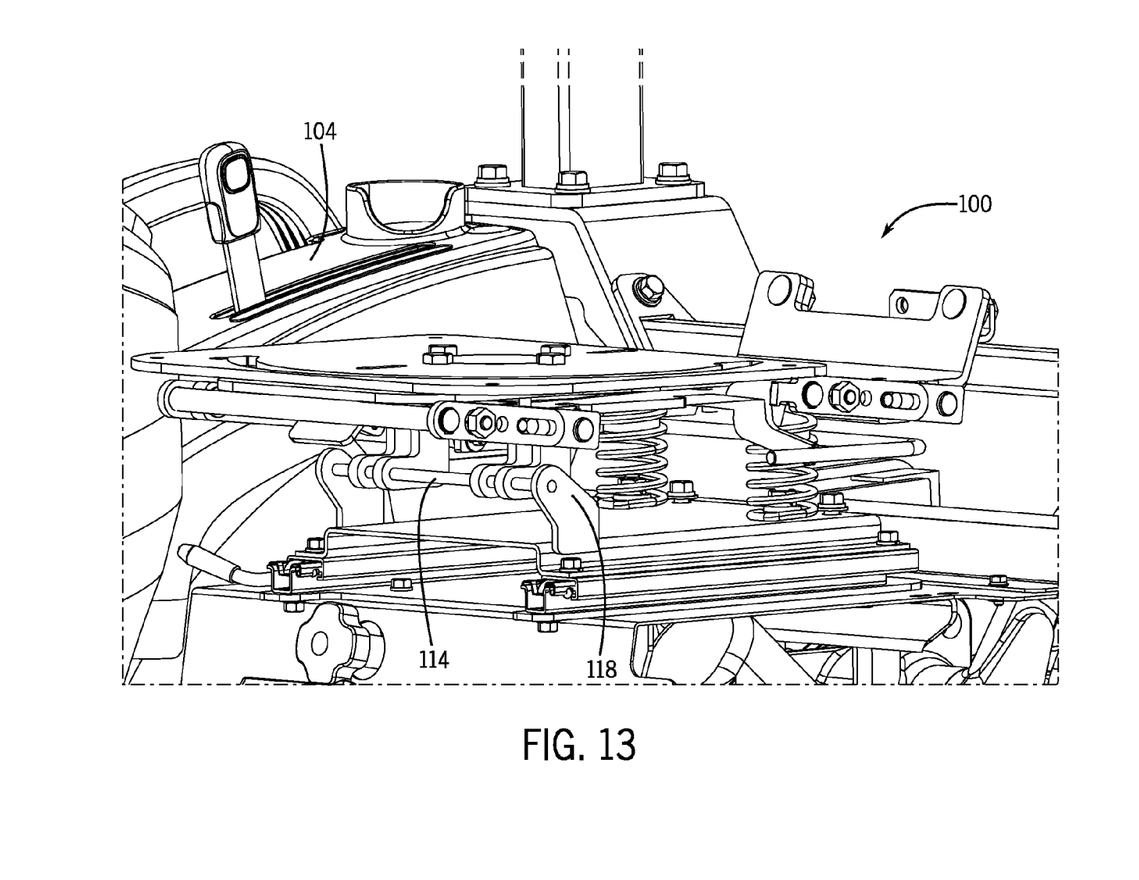
FIG. 13 is a perspective view of an adjustable seat support in accordance with the invention showing the attachment of the adjustable seat support bracket to a tractor.

Turning now to FIGS. 3 and 3A, the adjustable seat support 100 is shown. The adjustable seat support 100 has a base plate 108 that includes a plurality of mounting brackets 110, a plurality of retaining rod retention flanges 112. As shown in FIGS. 12-13, a typical operator's seat 102 is mounted to a vehicle by passing a retention rod 114 through a plurality of retention rod holes 112 located toward the front of the operator's seat, and securing the rear of the operator's seat to at least one suspension spring 116. The retention rod 114 is held in place using at least one cotter pin 118, although any other suitable means may be used without departing from the invention. The base plate 108 is not attached to the suspension spring 116, which allows the operator's seat 102 to rotate about the axis of the retention rod 114, thereby providing access to a storage area under the operator's seat, or to protect the seat from rain.

Figure 4:
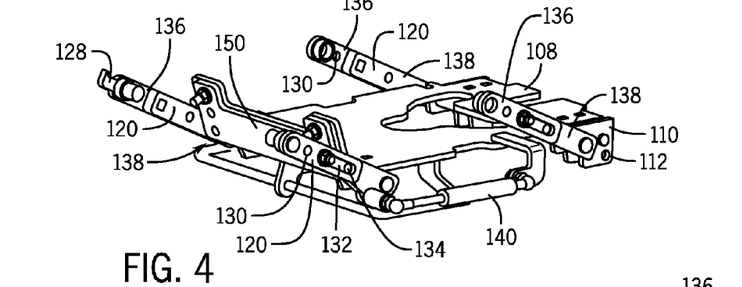
FIG. 4 is a detail perspective view of the adjustable seat support of FIG. 1 showing one embodiment of adjustable seat links in accordance with the invention.
Figure 5:
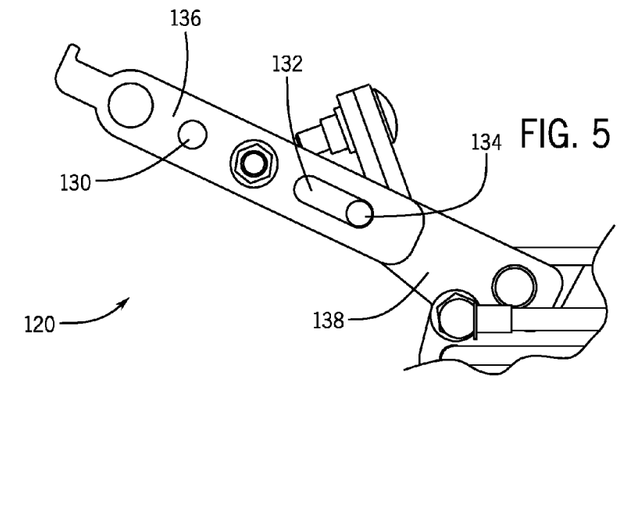
FIG. 5 is a detail side view of the adjustable seat links of FIG. 5 showing how one of the adjustable seat links may be adjusted.

Turning now to FIGS. 4-5, a plurality of adjustable links 120 are attached to the base plate 108. The adjustable links 120 offset a swivel plate 122 from the base plate 108. A seat plate 124 is rotatably engaged with the swivel plate 122 and is attached directly to the operator's seat 102. As shown, the adjustable links 120 are attached to the base plate and the swivel plate using carriage bolts and nuts, which allow the components to move relative each other. Alternatively, the adjustable links 120 may be attached using rods and cotter pins in a similar manner to the retention rod 114. Further, any other suitable means of rotatably attaching the adjustable links 120 to the base plate 108 and swivel plate 122 may be used without departing from the invention.

As shown in FIGS. 3 and 4, the swivel plate 122 further includes a swivel track 126. A finger pin 128 on one of the adjustable links 120 engages the swivel track 126 to limit the rotation of swivel plate 122. The swivel track 126 may be configured to provide varying degrees of rotation, and may also provide 360° of rotation if desired. Alternative embodiments of the invention may provide an embossed channel in combination with a spring pin to replace finger pin 128. Of course, any other suitable rotation limiting means may be used without departing from the invention.

Turning now to FIG. 5, it is possible to adjust the length of the adjustable links 120. As shown, each adjustable link 120 includes a plurality of adjustment holes 130, an adjustment channel 132, and an adjustment pin 134. Additionally, the adjustment links 120 include an upper portion 136 and a lower portion 138. The adjustment pin 134 is attached to the lower portion 138. The upper portion 136 includes the adjustment channel 132, which engages the adjustment channel 132 to align the upper portion to the lower portion 138. In the embodiment shown, there are two possible positions for the upper portion 136 to be attached to the lower portion 138. Additional adjustment positions may be used without departing from the invention. As shown, a carriage bolt and nut is used to secure the upper portion 136 to the lower portion 138. Optionally included on one or more of the adjustable links 120 is a mounting point for a gas spring 140. A gas spring 140 or any other suitable damper may be used to assist the operator in adjusting the position of the adjustable seat support 100.

Figure 6:
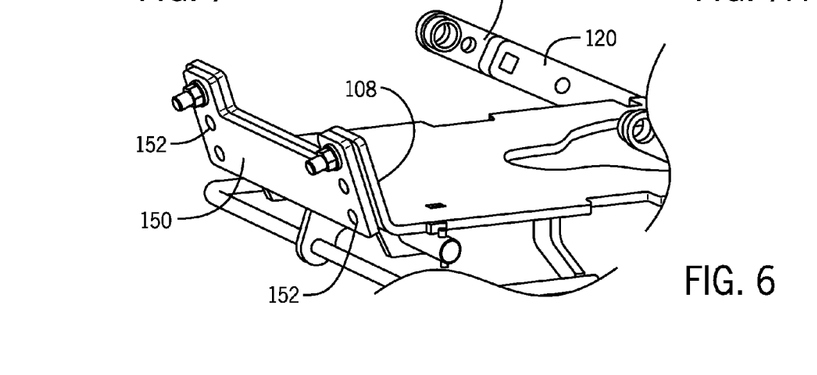
FIG. 6 is a detail perspective view of the adjustable seat support of FIG. 1 showing one embodiment of a height adjustment in accordance with the invention.
Figure 7:
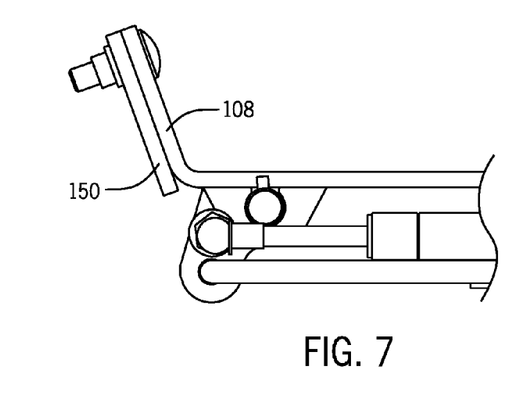
FIG. 7 is a detail side view of the height adjustment of FIG. 6 showing a height adjustment plate in a lower position.
Figure 7A:
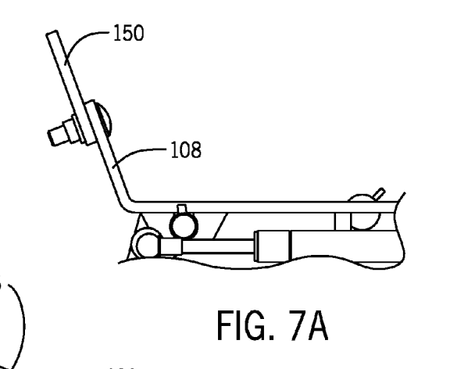
FIG. 7A is another detail view of the height adjustment of FIG. 6 showing the height adjustment plate in an upper position.

Turning next to FIGS. 6, 7, and 7A, the base plate 108 may further include a height adjustment plate 150. The height adjustment plate 150 provides a stop when the operator's seat 102 is moved between the forward facing position and the rearward facing position. As shown, the height adjustment plate 150 includes a plurality of holes 152 and is secured to the base plate 108 by two carriage bolts and nuts. Such a configuration provides a plurality of adjustment positions. Of course, a height adjustment plate with additional adjustment positions may be used without departing from the invention. When the operator's seat 102 is moved to a position over the height adjustment plate 108, the plate stops the movement of the seat at the desired height set by the operator.

Figure 8:
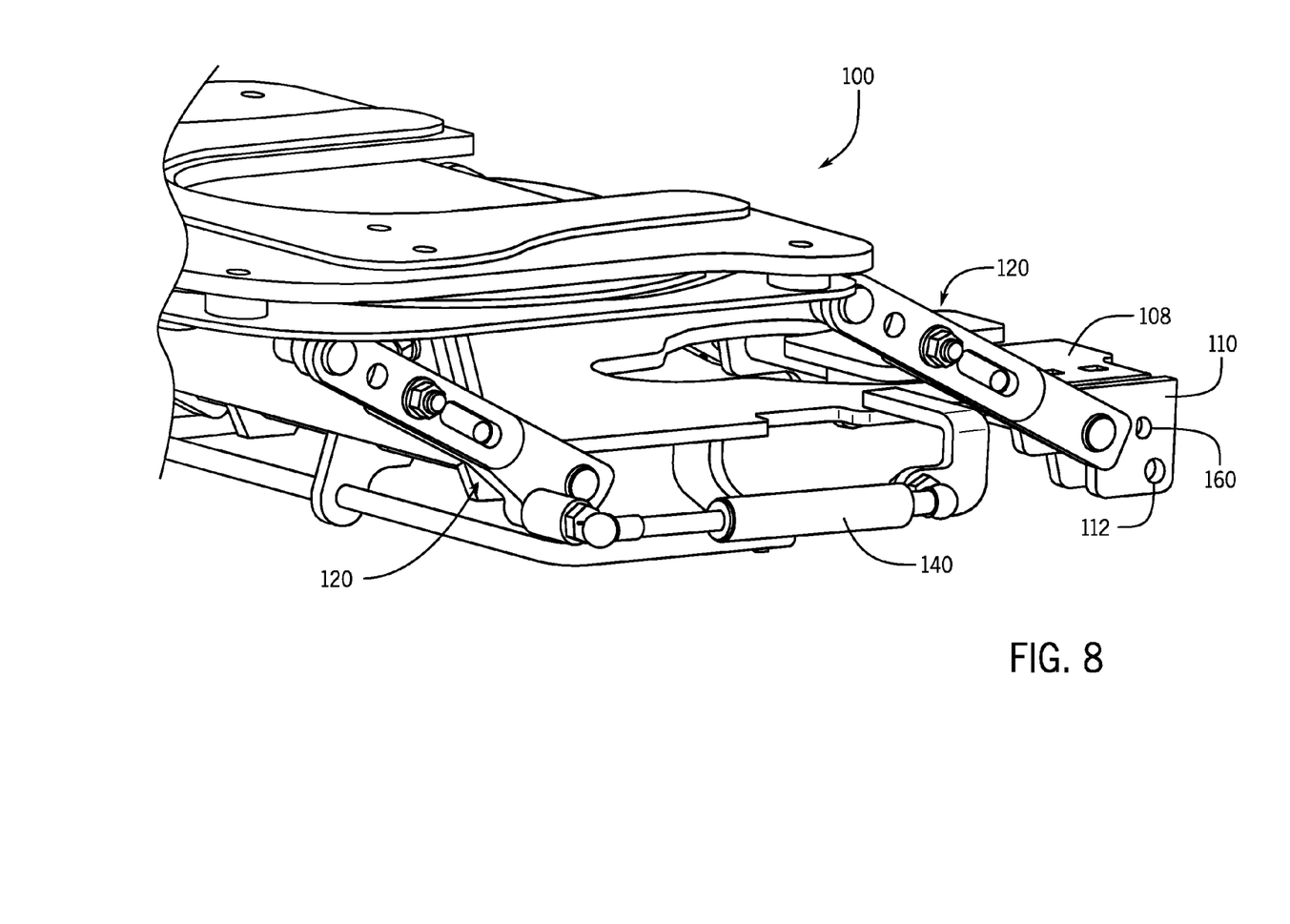
FIG. 8 is a detail perspective view of the adjustable seat support of FIG. 1 showing tractor mount holes.

FIG. 8 shows a plurality of tractor mount holes 160 included on the mounting brackets 110. The tractor mount holes 160 allow an additional degree of adjustment for the adjustable links 120. Each of the adjustable links 120 can be attached to whichever of the tractor mount holes 160 allow the adjustable seat support 100 to operate freely and in the preferred location.

Figure 9:
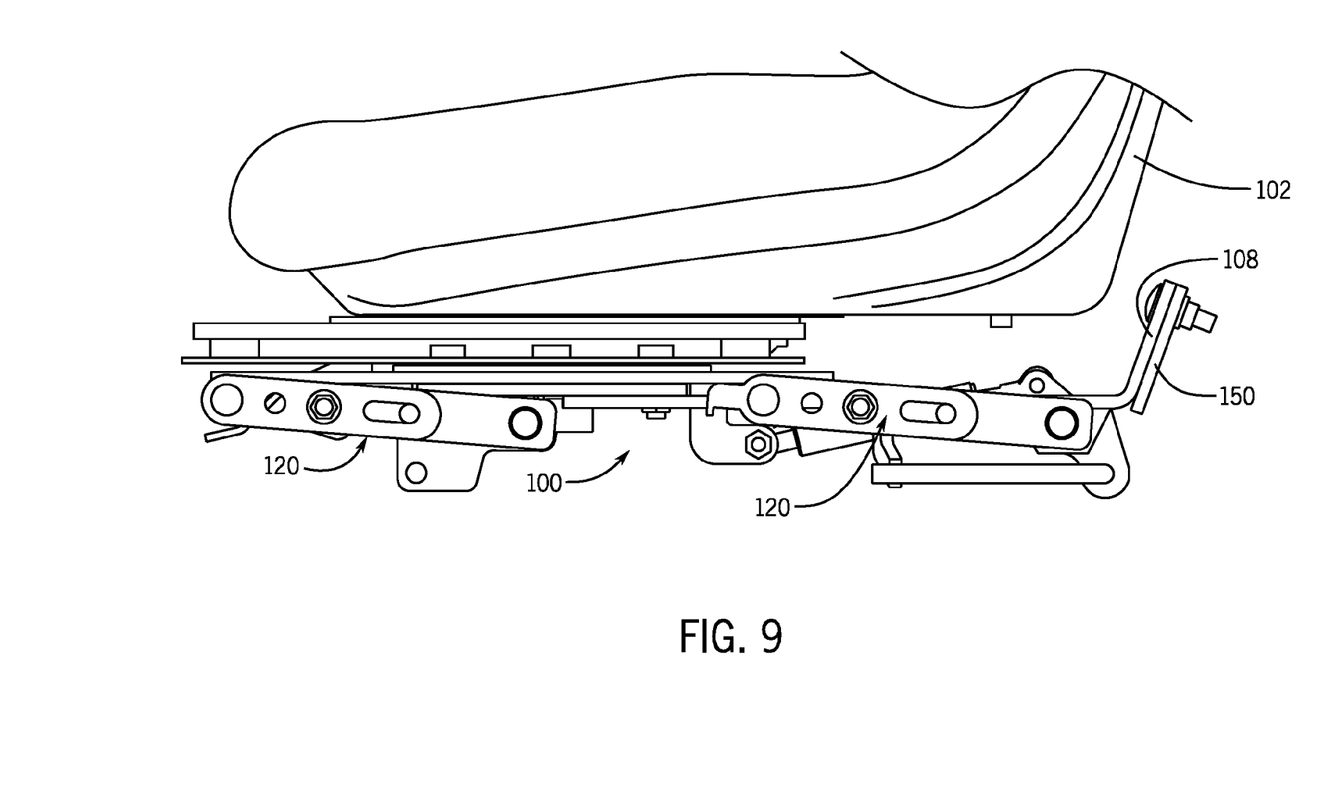
FIG. 9 is a side view of the adjustable seat support of FIG. 1.

Referring to FIG. 9, a fully assembled adjustable seat support 100 is shown with an operator's seat 102 installed. As shown in FIG. 9, the operator's seat 102 is in the forward operating position. All of the adjustments, whether it is adjusting the length of the adjustable links 120 or the height of the height adjustment plate 150 are controlled by carriage bolts and nuts, which require only one tool, a wrench, to adjust.

Figure 10:
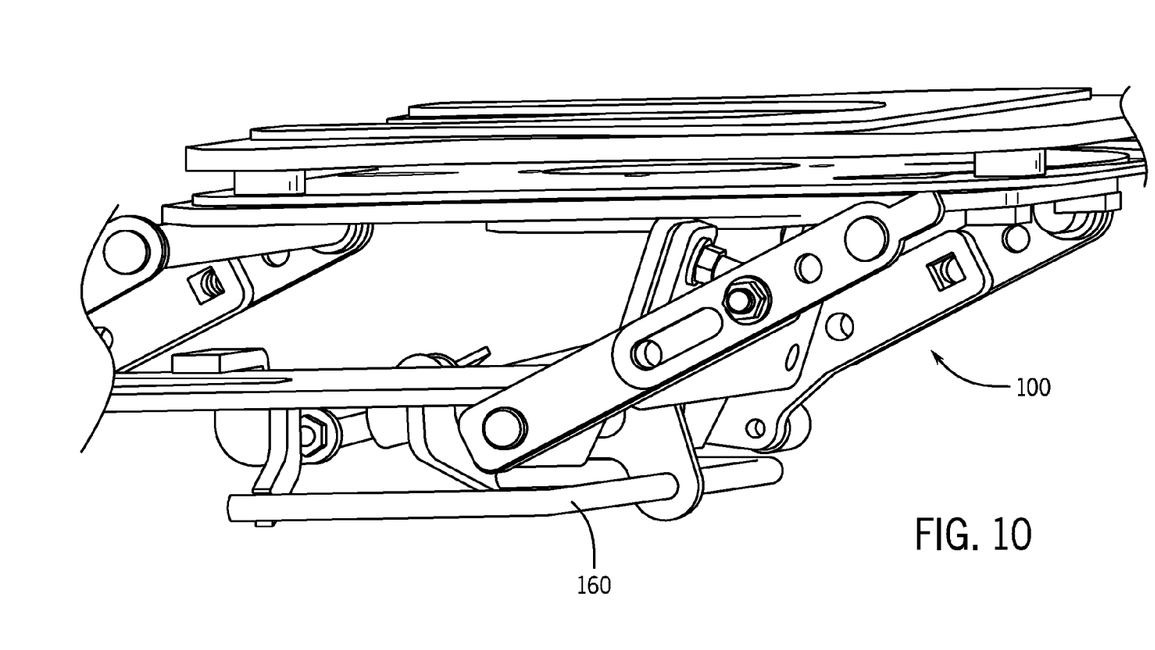
FIG. 10 is a detail perspective view of the adjustable seat support of FIG. 1.

FIG. 10 shows a seat belt protection bar 160 that may also be included in the adjustable seat support 100 to prevent pinching or tearing of a seatbelt during operation of the adjustable seat support.

FIGS. 11-20 show the process of replacing an existing operator's seat support with an adjustable seat support 100 in accordance with the invention. The adjustable seat support 100 uses most of the original tractor seat mount components. Installation of the adjustable seat support 100 requires only simple brackets to be discarded, thereby limiting the cost impact of installing the adjustable seat support. This method also offers safe, controlled, and smooth transition from tractor seat position to rear attachment seat position, unlike some existing methods that increase the chance of pinching fingers due to quick snapping mechanisms that are spring loaded.

Figure 11:
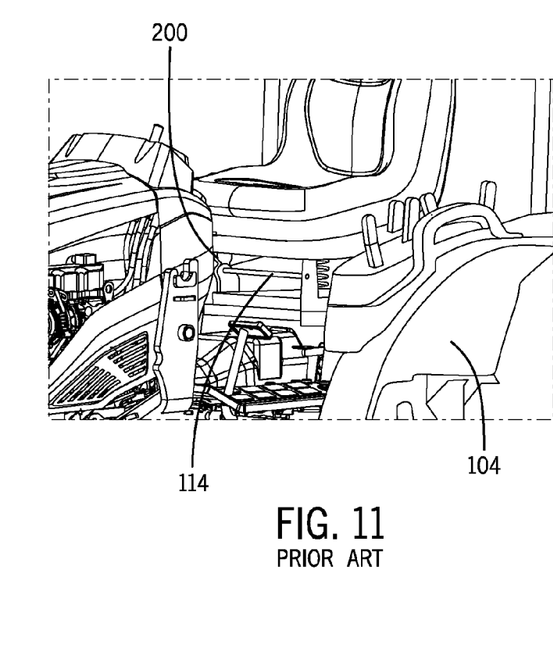
FIG. 11 is a perspective view of a prior art seat support.

Turning now to FIGS. 11-12, a conventional operator's seat 102 is shown attached to a conventional operator's seat support 200. As shown, the operator's seat 102 is not adjustable, and is attached to the tractor 104 via the retaining rod 114 and rests on top of a plurality of suspension springs 116.

To replace the operator's seat support 200, a user first removes the retaining rod 114 by removing the cotter pin 118 from the retaining rod and sliding the retaining rod out of the operator's seat support, which allows the entire seat and seat support assembly to be removed.

FIG. 13 shows the installation of one embodiment of an adjustable seat support 100 in accordance with the invention onto the tractor 104. The adjustable seat support 100 uses the same retaining rod 114 and cotter pin 118 used to attach the conventional operator's seat support 200. Once the retaining rod 114 is installed, the base plate 108 rests on the suspension springs 116.

Figure 14:
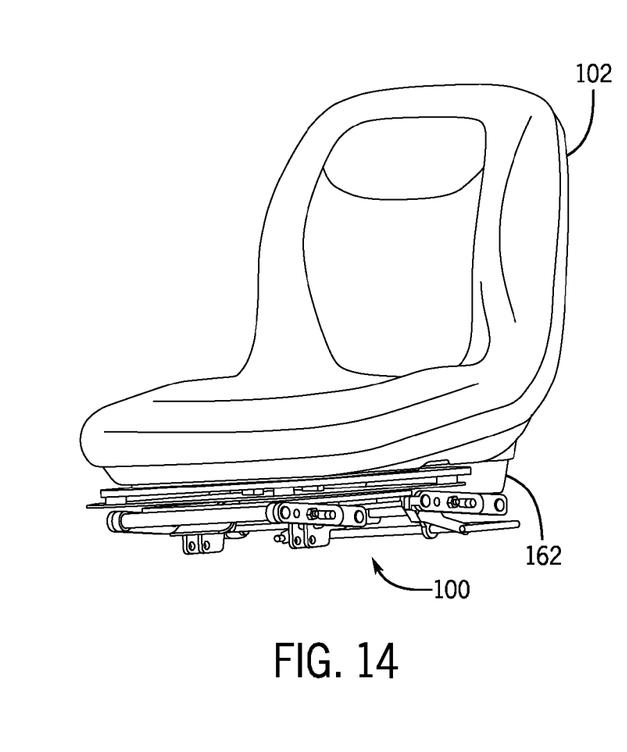
FIG. 14 is a perspective view of the adjustable seat support of FIG. 14 showing a seat attached to the adjustable seat support bracket.
Figure 15:
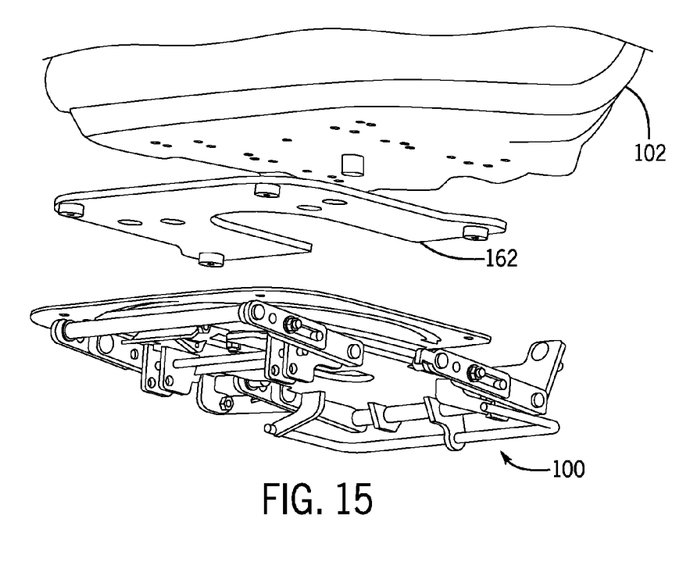
FIG. 15 is a partially exploded view of the adjustable seat support of FIG. 14 showing a seat adapter plate positioned between a seat and the adjustable seat support bracket.

Once the adjustable seat support 100 is installed onto the tractor 104, the operator's seat 102 may be attached to it using an adapter plate 162. The adapter plate 162 is selected by the operator to match the make and model of seat being used. Once the operator's seat 102 is secured to the adjustable seat support 100, it is ready to be used.

Figure 16:
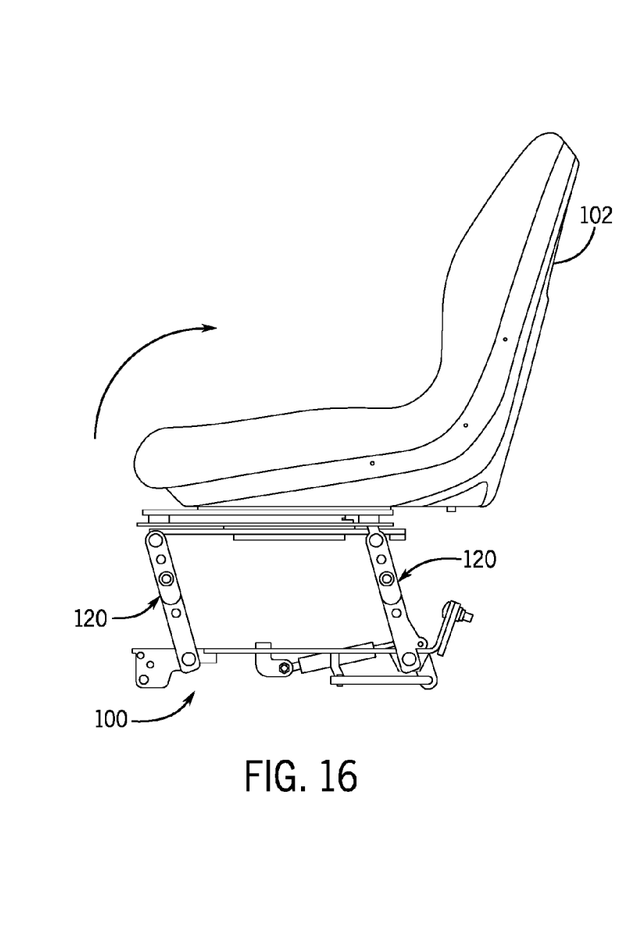
FIG. 16 is a side view of the adjustable seat support of FIG. 14 showing movement of the seat from a front facing to a rear facing position.
Figure 17:
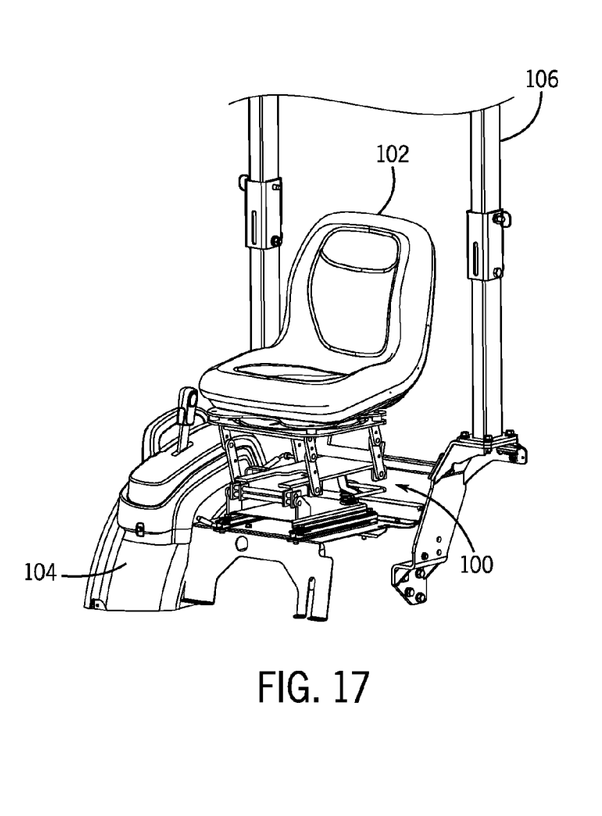
FIG. 17 is a perspective view of the adjustable seat support of FIG. 14 showing movement of the seat from a front facing to a rear facing position.

FIGS. 16-20 show the operation of the adjustable seat support 100 installed on a tractor 104. FIG. 16 shows the first step as the operator's seat is moved from the forward facing to the rearward facing position. As shown, an operator lifts the seat partially until it hits a stop position. The stop is in place to prevent a forward facing seat from being positioned outside the ROPS limitations. Upon hitting the stop, the operator must rotate the seat to face rearward, at which point the seat will be able to continue to move into the rearward facing position. FIGS. 16-17 show the adjustable seat support 100 extended to the stop position, but still facing forward.

Figure 18:
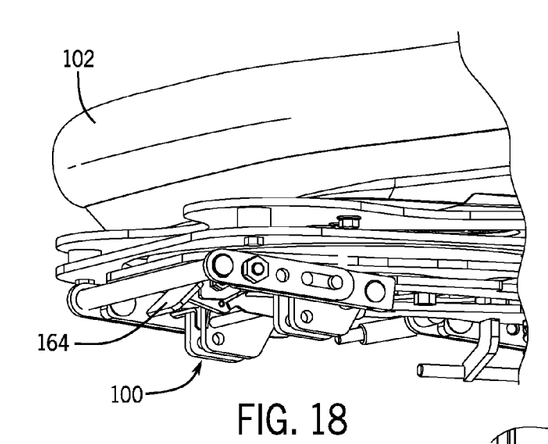
FIG. 18 is a detail perspective view of the adjustable seat support of FIG. 14 showing a release mechanism to allow the seat to be moved between the front and rear facing positions.

FIG. 18 shows a release mechanism 164 that must be engaged by the operator to allow the operator's seat 102 to rotate to face rearward. As shown, the release mechanism 164 is a simple spring-loaded latch, but any suitable means may be used without departing from the invention.

Figure 19:
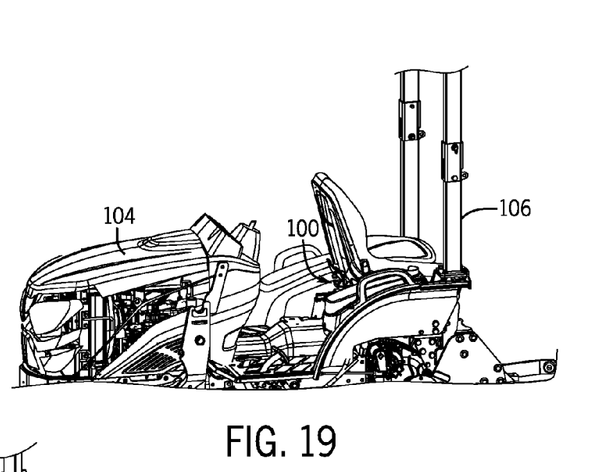
FIG. 19 is a perspective view of the adjustable seat support of FIG. 14 showing the rotation of the seat to a rear facing position on a tractor.
Figure 20:
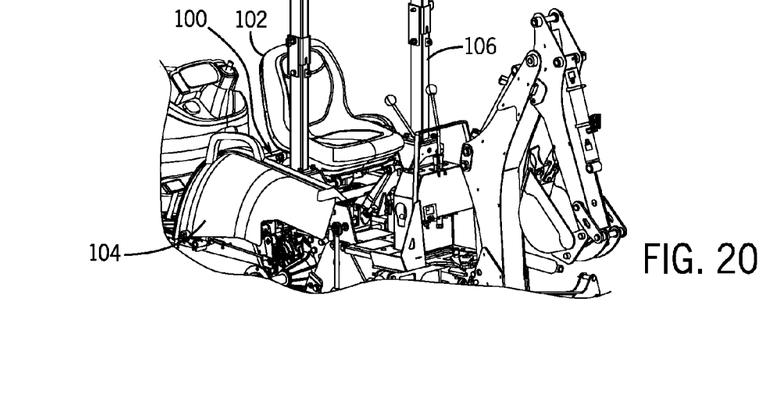
FIG. 20 is a perspective view of the adjustable seat support of FIG. 14 showing the seat in a rear facing position on a tractor.

FIGS. 19-20 show the adjustable seat support 100 in the rearward facing position. As shown, the operator's seat 102 has been swiveled to face rearward, and the adjustable seat support has allowed the adjustable seat support to rest in the optimal position for operating the rear attachment, in this case, a backhoe.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An adjustable seat support for a vehicle, comprising:
a base plate removably attached to the vehicle;
a swivel plate having a swivel channel and attached to the base plate by a plurality of links, the plurality of links allowing horizontal movement of the swivel plate in relation to the base plate;
a seat plate rotatably attached to the swivel plate;
each of the plurality of links including an upper portion and a lower portion that may be adjusted to change the length of the links; and
wherein adjustment of the plurality of links causes the seat plate to move vertically in relation to the base plate.

2. The adjustable seat support of claim 1, wherein the upper portion and lower portion are removably attached to each other using carriage bolts and nuts.

3. The adjustable seat support of claim 1, wherein the swivel plate limits the degree of rotation of the seat plate.

4. The adjustable seat support of claim 1, wherein a height adjustment plate is removably attached to the base plate.

5. The adjustable seat support of claim 4, wherein the height adjustment plate is removably attached to the base plate using carriage bolts and nuts.

6. A method of using an adjustable seat support for a vehicle comprising the steps of:
attaching a base plate having a plurality of adjustable links to a vehicle, wherein the adjustable links are adjustable in length;
attaching a height adjustment plate to the base plate;
attaching a swivel plate to the plurality of adjustable links;
rotatably attaching a seat plate to the swivel plate;
attaching a seat to the seat plate;
adjusting the lengths of the adjustable links to locate the seat in a desired position for an operator when the seat is in a forward facing and in a rearward facing position;
adjusting the height adjustment plate to locate the seat in a desired position for an operator when the seat is in the rearward facing position; and
selecting either the forward facing or rearward facing position.

7. A method of using an adjustable seat support for a vehicle comprising the steps of:
attaching a base plate having a plurality of adjustable links to a vehicle;
attaching a height adjustment plate to the base plate;
attaching a swivel plate to the plurality of adjustable links;
rotatably attaching a seat plate to the swivel plate;
attaching a seat to the seat plate;

adjusting the adjustable links to locate the seat in a desired position for an operator when the seat is in a forward facing and in a rearward facing position;
adjusting the height adjustment plate to locate the seat in a desired position for an operator when the seat is in the rearward facing position;
selecting either the forward facing or rearward facing position;
lifting the seat partially until the seat reaches a stop position;
rotating the seat 180° so that the seat is facing the rear of the vehicle; and
moving the seat until the seat rests upon the height adjustment plate.

* * * * *